United States Patent [19]

Niedermeyer

[11] 4,266,112

[45] May 5, 1981

[54] WEB-CUTTING PROCESS

[76] Inventor: William P. Niedermeyer, 1024 Mt. Mary Dr., Green Bay, Wis. 54301

[21] Appl. No.: 12,032

[22] Filed: Feb. 14, 1979

[51] Int. Cl.$^3$ .............................. B26F 3/14; B26F 3/00
[52] U.S. Cl. .................... 219/121 LN; 83/37; 83/53; 83/177; 83/428
[58] Field of Search .............. 83/428, 53, 56, 177, 83/37; 219/10.43, 121 LG, 121 LJ, 121 LN, 121 LS, 121 LM

[56] References Cited

U.S. PATENT DOCUMENTS

| | | | |
|---|---|---|---|
| 3,066,394 | 12/1962 | Litzka | 83/428 X |
| 3,486,957 | 12/1969 | Fish et al. | 83/428 X |
| 3,582,466 | 6/1971 | Quirk | 219/121 LG |
| 3,614,369 | 10/1971 | Medley | 219/10.43 |
| 3,625,813 | 12/1971 | Eckelman | 83/177 X |
| 3,761,675 | 9/1973 | Mason et al. | 219/121 LG |
| 3,932,726 | 1/1976 | Verheyen | 219/121 LG |
| 3,978,748 | 9/1976 | Leslie et al. | 83/177 X |
| 4,048,885 | 9/1977 | Miyakita et al. | 83/177 X |
| 4,137,804 | 2/1979 | Gerber et al. | 83/177 |
| 4,149,918 | 4/1979 | Cislak | 219/121 LG |

Primary Examiner—J. M. Meister
Attorney, Agent, or Firm—Francis J. Bouda

[57] ABSTRACT

A cutting method and apparatus using a plurality of impact-type laser or water jet cutters mounted on a framework above a moving web. The cutters are disposed in a spaced relationship to each other along a line parallel with the direction of web travel. By spacing the cutters a distance substantially equal to the desired product length, each of the cutters simultaneously cut from the web similar portions of one side of each of two consecutive products. The cutters are arranged so that as the web moves one product length, each of said cutters cuts from the web on the other side of a substantially central axis similar portions of the other side of said products. Embodiments include means to increase or decrease velocity of the cutters when mounted on a second framework which is also movable in a direction parallel to the direction of the web movement. Still other embodiments include means to stop or change velocity of the web relative to the fixed machine base and hence also relative to the cutters supported by the base on movable framework.

19 Claims, 27 Drawing Figures

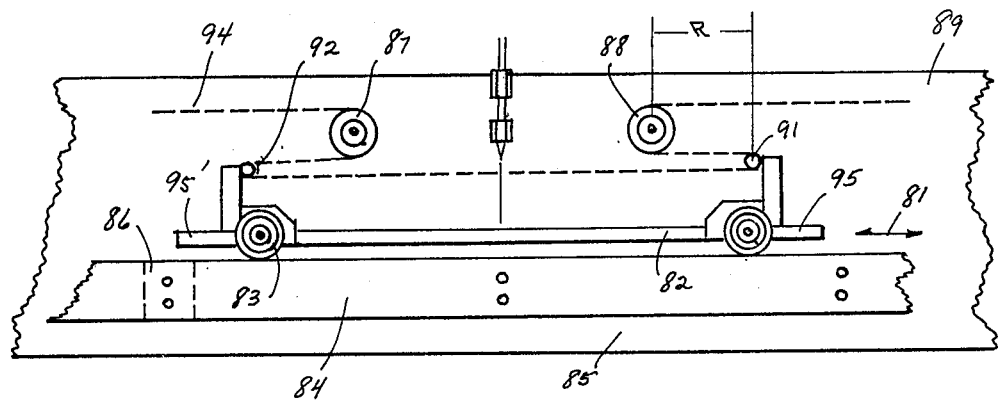
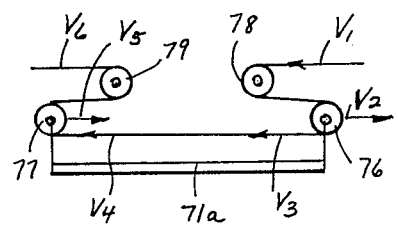
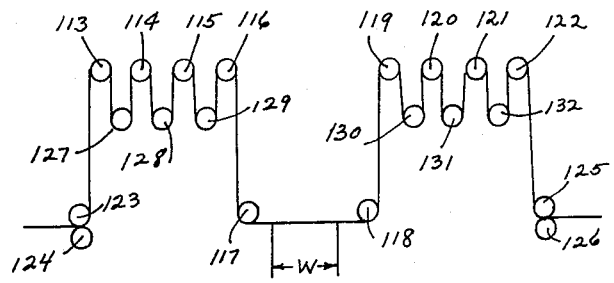
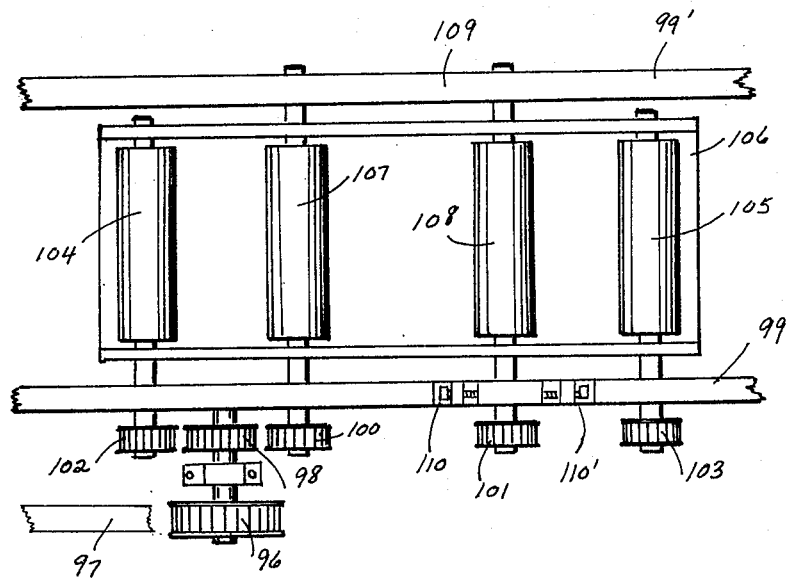

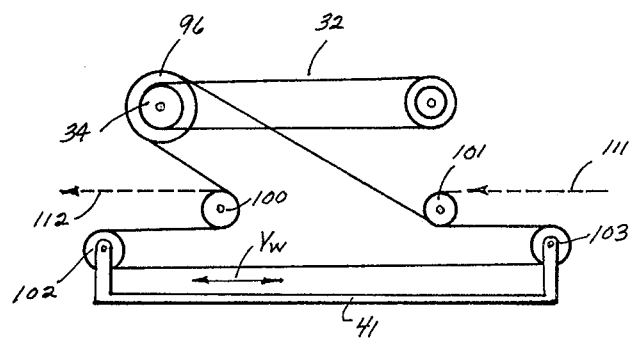
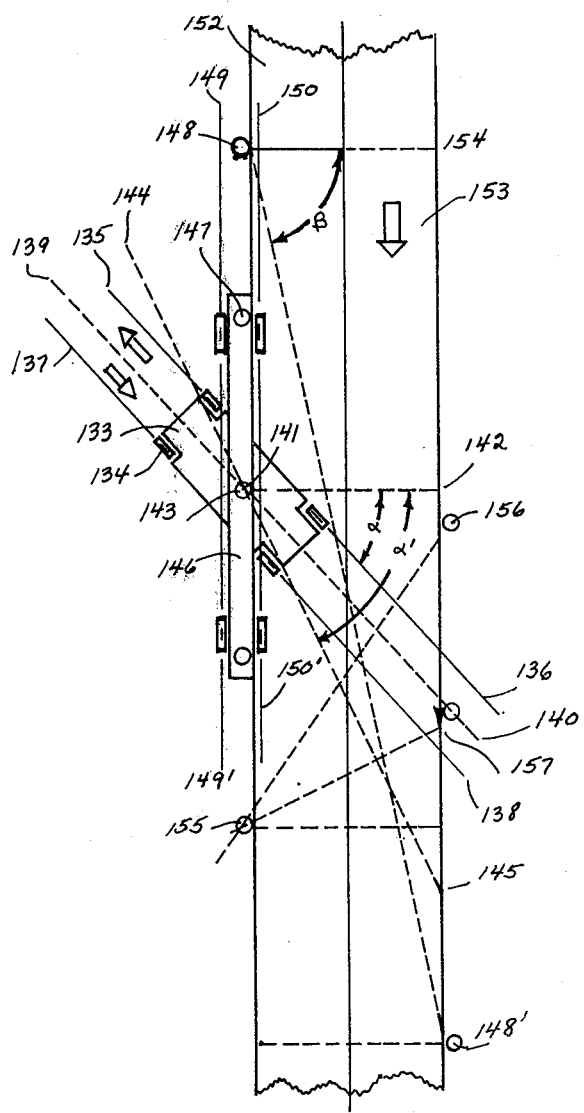
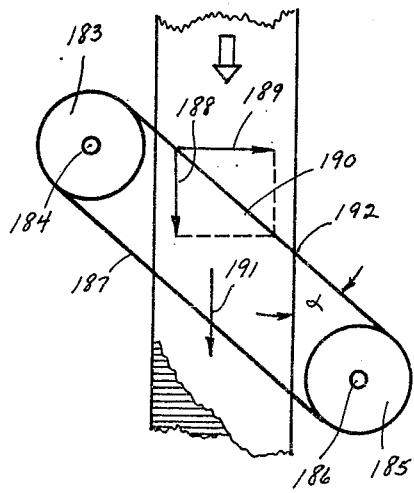

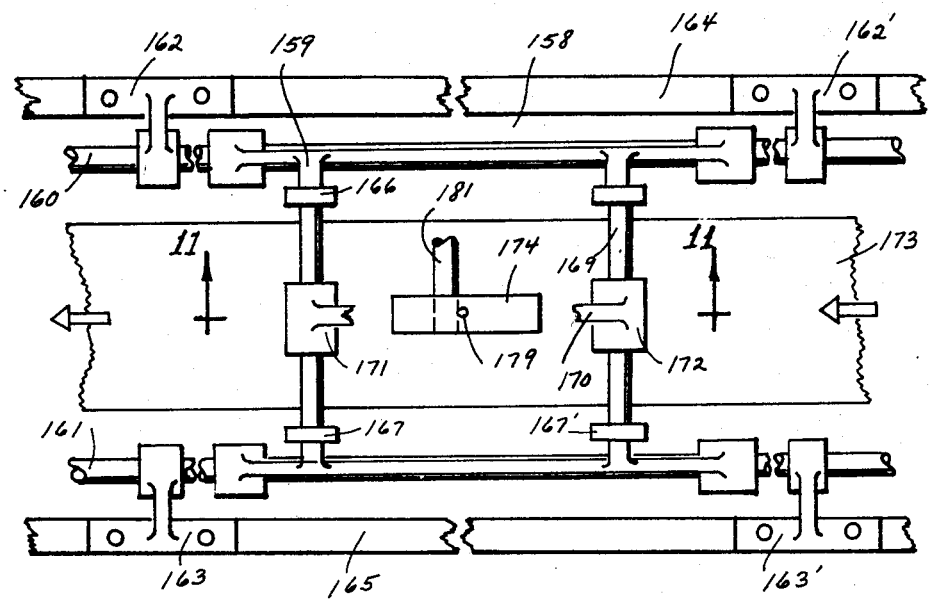

LEGEND $V_C$ = VELOCITY OF CUTTER ALONG CURVE
$V_T$ = VELOCITY OF CUTTER TRANSVERSE OF WEB FLOW
$V_W$ = VELOCITY OF CUTTER PARALLEL TO WEB FLOW
$\alpha$ = ANGLE BETWEEN TANGENT TO THE CURVE AND A LINE PARALLEL TO WEB FLOW AT ANY INSTANT

LEGEND

CUT LINE SHIFTS RIGHT WHEN WEB OR CUTTER ADVANCES

CUT LINE SHIFTS LEFT WHEN WEB OR CUTTER IS RETARDED

| LEGEND | 329 ← RETARD WEB |
|---|---|
| | 327 ← RETARD CUTTER |
| | 330 → ADVANCE WEB |
| | 326 → ADVANCE CUTTER |

LEGEND – SEE FIG 24

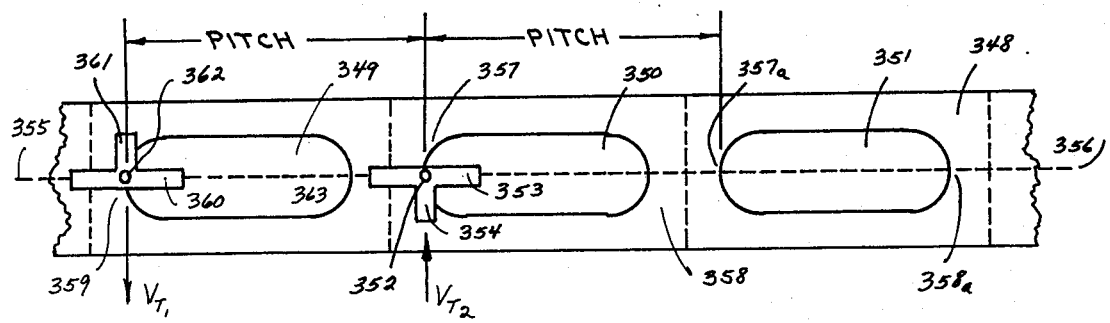
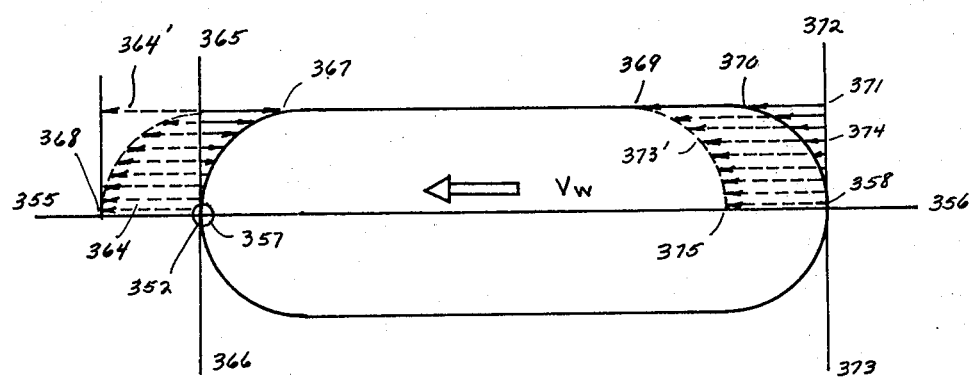

WEB-CUTTING PROCESS

BACKGROUND OF THE INVENTION

In the field of cutting devices, there is an abundance of prior art covering well known techniques of cutting with metallic blades, and substantial art in various types of circular blades, extended band saw blades, anvils and mechanisms for loading, adjusting, etc.,. Circular blade cutting (and slitting) is achieved transversely and longitudinally with shear cutting and/or score or pinch-type cutting devices.

For the numerous applications requiring longitudinal cuts, the art is crowded with disclosures of slitting blades and associated devices such as anvils, anvil holders and blade sharpeners. Transverse cutting devices and arrangements are also covered in many prior art patents, and special machines and apparatus are employed to make transverse cuts while the material is moving, or is capable of being moved forward between transverse cuts.

Certain devices also teach the stoppage of web material for the purpose of making transverse cuts during a dwell portion of the cycle, for example, U.S. Pat. Nos. 3,370,496 and 3,456,540.

There are numerous product uses (and substantial prior art) requiring cutting of apertures in the material, and/or, cutting of materials into special shapes. However, with these special shapes and apertures, prior art teachings lead into a class of disclosure that generally involves separate, non-continuous punching, forming and/or cutout operations and devices, or alternately, rotary devices which include specially shaped dies co-acting with a second anvil cylinder that can be hardened, or has hardened inserts of special shape. It is well known that when using rotary cylinders, cutting or shaping operations that are in register with the length of the cut piece will necessarily be a function of a repeat length substantially equal to the circumference of the cylinder or a multiple thereof, and hence, a given pair of cylinders is thereby limited to a single repeat length. When product length (repeat) changes are not a multiple of circumference, a new pair of cylinders is required, together with gearing and other associated drive parts, and this often involves a costly inventory of change parts. The expense of setup for length changes involves the cost of labor, but more significantly, valuable and costly lost production, and this total cost often dictates "minimum orders" or piece runs that are required for economical production.

In this invention, certain devices and methods are disclosed which can substantially minimize changeover time with the beneficial result that shorter production runs become economically feasible.

When using rotary cylinders for punching operations to make apertures in a material, there is a narrow range of "working depth" or "working diameter" that is permissible before there is a mismatch between the cylinder working diameter and the gear pitch line, and with greater depth, severe die or drive gear wear occurs.

It is accepted in the trade that even under optimum conditions, mechanical elements such as blades, anvils, dies, inserts, . . . etc., are subject to high wear and need frequent sharpening or replacement.

In the field of cutting shaped objects, prior art teachings are much less abundant, but certain art exists, for example, U.S. Pat. No. 3,381,563.

Considering the use of blades and anvils, or dies and coacting rolls, it becomes evident that precision alignment is difficult to achieve at original setup and is difficult to maintain during running, said effect resulting in speed limits vis-a-vis acceptable product quality control. Additionally, the initial expense of curvilinear cutting dies is very high because of the hardness required for life factors, and the resultant difficulty of machining for high precision mating relationship with the co-acting roll.

In recent years, the development of new cutting devices and their commercial adaptability makes new techniques possible. New cutting devices, for example, laser beam or water jet cutters will be referred to hereinafter as "impact beam" or "impact jet" cutting devices.

Because these cutters penetrate the material at a small point (as opposed to a line or a portion of a line), these impact type cutters can be used as part of a cutting apparatus wherein the cutter is translated in different directions at a pre-selected uniform, or variable, velocity, in combination with devices that permit uniform or non-uniform velocity of the material being cut, these motions and velocities allowing complete flexibility regarding the cut line shape and configuration at slow speeds. Design limits may make the cutting of certain special shapes impractical at higher speeds.

This invention differs from prior art by disclosing the positioning of the cutter over the material being cut while the material is moving.

The closest prior art teaching appears in the December, 1976 issue of MECHANICAL ENGINEERING (pp 40–44). The principle difference over the apparatus therein described is the inventive combination of a plurality of in-line cutters working in in combination with a web in motion, and the subsequent modification of the velocity of the cutter supporting framework due to web movement. A second basic difference between this disclosure and the movable cutter in the above-mentioned article is the use of a plurality of cutter-supporting frames, or the use of at least one cutting device on each of a plurality of frames, alone, or in combination with stationary cutters that produce straight line cuts as the web moves past same. A third basic distinction is the disclosure of modifying the velocity of the moving material as it passes through the "effective cutting zone."

It is understood that the embodiments shown for "interrupted" jet stream cutting can be rearranged in any embodiment using an intermediate diverter or baffle to produce a discontinuous cutting stream, or if design factors permit, the actuation of external means that turns the impact type cutter on or off as desired.

In the detailed description, it will become apparent that while the inventive system describes a completely flexible system for cutting any shape, there are a great many variables involved, and these factors are related and often dependent functions that affect the maximum speeds attainable.

While this inventive disclosure defines inter-related variables, it will be appreciated that each variable is a range of values as defined by certain practical and/or mechanical design limitations. However, minimum and maximum values can be assigned, and through comparative evaluations, optimum operating speeds can be determined.

In practical terms, and in order to minimize considerable engineering design effort required for each application, this inventive concept very beneficially lends itself to servo-loop electrical systems and computer programming. It is within the scope of this invention to determine and construct a suitable program such that the limits imposed on dependent and independent functions are evaluated by a computer and will then direct proper output signals to each of these functions to automatically adjust the mechanism involved to yield optimum speeds.

SUMMARY OF THE INVENTION

The web cutting apparatus of the present invention includes the frame having a carrier portion for a web of sheet material and a cutting device operatively supported in relation to the frame to cut the web materials carried across that frame. Because the frame has at least one movable element to transfer the web and because the cutter is independently movable in respect to the frame and to the movement of the web, a related plurality of cuts can be made in the moving web to provide the desired shape and configuration of the items cut from the web. Although I prefer to use water jet or laser beams as a cutting mechanism, hot wire cutting devices or amplified high frequency sound cutting devices are within the scope of this disclosure.

This invention is primarily described as a cutting system wherein first motion of the web and second transverse motion of the cutters in combination with a plurality of cutting devices defines a high speed cutting system.

Addition of a second framework to produce a third independent motion $M_3$, which is parallel to $M_2$, extends the cutting range or increases speed capability, or both.

A web speed changing device is added to yield any web speed from zero to maximum, and can reverse the web speed to yield reverse cuts within the parameters of movement of the devices for $M_2$ and $M_3$.

Thus, it is an object of this invention to provide a cutting system that utilizes at least two basic motions thereby making it possible to cut a substantial number of different shapes on the same machine, said shapes being cut from a moving web.

It is a further object of this invention to provide a cutting system that can utilize continuous or intermittant impact-laser cutters, or alternately, impact-jet type cutters operating continuously, subject to interruption by mechanical interposition of plates, or other means, to allow discontinuity of operation.

A still further object of this invention is to provide a system that will cut similar shapes on flexible or rigid materials.

Another object of this invention is to provide a cutting system that produces shapes requiring reverse cutting.

Another object of this invention is to provide a cutting system wherein a plurality of cutters can be selectively positioned to define a series of longitudinally spaced and similarly cut lines.

Another object of this invention is to provide a cutting system wherein a plurality of cutters can be selectively placed to result in a series of similar cut lines which are out of phase by any fractional or whole multiple of the "pitch", or normal repeat, or the first cut.

Another object of this invention is to provide a cutting system whereby several shapes can be produced concurrently from a moving web or sheet material, said several shapes reducing scrap.

Another object is to maximize cut product flexibility and production speed with a machine that will respond to repeatable "cutting programs," thus reducing setup time for production runs involving different shapes.

Another object of this invention is to provide a cutting system that minimizes or eliminates the need for special mechanical parts inventory such as rotary die cylinders, etc., said parts being replaced by a pre-arranged computer program, or programmable controllers.

With the above and other objects in view, more information and understanding of the present invention may be achieved by reference to the following detailed description:

DETAILED DESCRIPTION

For the purpose of illustrating the invention, there is shown in the accompanying drawings a form thereof which is at present preferred, although it is to be understood that the various instrumentalities of which the invention consists can be variously arranged and organized and that the invention is not limited to the precise arrangements and organizations of the instrumentalities as herein shown and described.

In the drawings, wherein like reference characters indicate like parts:

FIG. 3 is a schematic drawing of the web velocity changing mechanism.

FIG. 5 is a side elevation of the device of FIG. 4.

FIG. 6 is a plan view of an embodiment wherein all rollers of the web velocity changing mechanism are driven.

FIG. 7 is a side view schematic of the device of FIG. 6.

FIG. 8 is a side view schematic of an embodiment using pluralities of rollers to produce web velocity change.

FIG. 9 is a plan view showing a framework arranged for reversible motion across the web at some angle not parallel with the direction of the web.

FIG. 10 is a plan view showing a second slidable frame attached to and dependent of the slidable motion of the first frame.

FIG. 11 is a vertical cross-sectional view along line 11—11 of FIG. 10, showing the addition of a jet stream interrupting device.

FIG. 12 is a plan view of an arrangement wherein the cutting device is mounted on a continuous chain, and in this instance with a speed relationship that produces a transverse cut in the moving web.

FIG. 26 illustrates a cutter and frame arrangement, in plan view, said arrangement used to cut apertures in a moving web.

FIG. 27 is an enlargement of a portion of FIG. 26.

Figure 1:
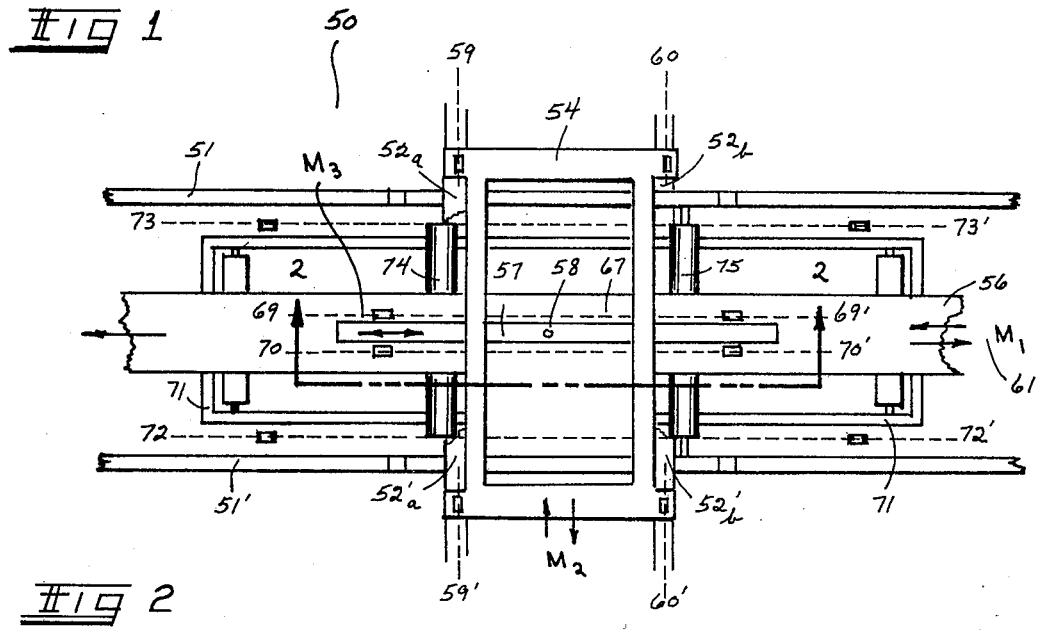
FIG. 1 is a plan view showing various devices arranged to provide three basic motions.

The inventive cutting system is shown generally as 50 in FIG. 1. Portions of the system are cut away for clarity. Main frame members 51 and 51' support cross members 52$_a$ and 52$_b$ (cutaway) which form a transverse pair of rails for rollers 53, said rollers being attached to and providing suspending support for transversely movable frame 54 (shown in section in FIG. 2).

With cutout 55 (see FIG. 2) in side frame members 51 and 51', the movable framework 54 is capable of moving transversely of web 56. Framework 54 moves transversely along lines 59–59' and 60–60' which are shown as being perpendicular to the direction of travel of web 61–62; however, rails 52$_a$ and 52$_b$ can be at any angle to the direction of web movement.

Downwardly extending rods 63 and 63' (FIG. 2) support rails 64, said rails supporting movable framework 57 along lines 69–69' and 70–70'. An impact type cutting device 58 is fixedly attached to framework 57, and it will be appreciated that at the position shown in FIGS. 1 and 2, impact cutting of web 67 will occur along line 65–66 at point 68. However, as framework 54 and framework 57 are moved from the position shown in FIG. 1, cutting position 68 will move transversely and longitudinally from said point.

In addition to the bi-directional cutting position changes described, the location of the web beneath the cutaway device 58 can be advanced or retarded. This additional longitudinal change is made possible by a means for changing the velocity of the central portion 67 of the web 56, said central portion 67 being spaced beneath and inwardly of rollers 74 and 75.

A longitudinally movable frame 71 is supported on rails 76, said rails allowing movement of the frame 71 in the web direction parallel with lines 72–72' and 73–73'. A pair of rollers 74 and 75 are rotatably fixed in frame 51 and 51'. As movable frame 71 advances or retards, the velocity of the web portion 67 changes, and is different from, the velocity of the incoming web 61 and the exiting web 62. Hence, the cutting device 58 will sever the web 67, while the web portion 67 is moving at a greater velocity, a lesser velocity, or the same velocity as the web portions 61 or 62.

The velocity changing system, and the resultant change of the cutting point relative to the web (not relative to the main frame) are discussed in more detail hereinbelow.

Figure 2:
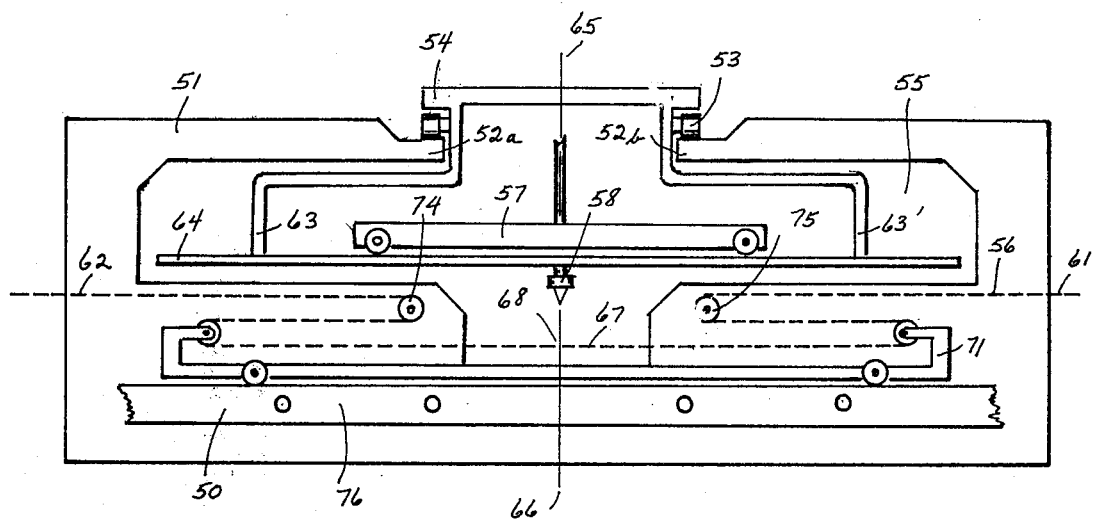
FIG. 2 is a vertical cross-sectional view along line 2—2 of FIG. 1.

FIGS. 1 and 2 represent the most flexible system, but these illustrations are not intended to be limiting. For example, more than one longitudinally moving framework can be used, and more than one transversely moving frame can be used. Also, each of the plurality of like frames can be moved independently and can therefore describe a different velocity and direction of the cutting devices attached thereto.

The basic principle of the web velocity changing device is shown in FIG. 3. In the schematic drawing, $V_1$ is the incoming web velocity, and the exit velocity is $V_6$. Due to the action of the "shifter" mechanism $71_a$ and the resultant movement of the attached rollers 76 and 77, the web section between 76 and 77 will change velocity relative to $V_1$ and $V_6$ which are equal.

When the shifter framework $71_a$ is moving in the direction shown by arrow $V_2$, the resultant velocity of $V_3 = V_1 - 2V_2$, and velocity $V_6 = V_4 + 2V_5$ (see left side of FIG. 3). For example, if $V_1$ equals 1 ft./sec., $V_6$ will also equal 1 ft./sec., and if the framework $71_a$ is shifted at ½ ft. per sec., $V_3$ will be zero, and $V_6$ remains equal to the infeed web velocity $V_1$ at a value of 1 ft./sec.

If the shifter mechanism moves to the left in FIG. 3, the web speeds will be $V_3 = V_1 + 2V_2$ and $V_6 = V_4 - 2V_5$ and with the same values as above, equal results are obtained for $V_1$ and $V_6$, but the velocity of the central portion $V_w$ will be 2 ft./sec.

In the preferred embodiment, "air-greased" rods are used instead of rollers 76 and 77, said rods substantially reducing the rotational inertia as opposed to tubular roller forms. It is within the scope of this invention that if the identified rods or rollers 76-77-78-79 in FIG. 3 are a "set," any multiple of said set can be used, with the result that a small change in $V_2$ or $V_5$ will cause a greater velocity change in $V_3$ and $V_4$ in porportion to the multiple. The shifter mechanism can also be moved at uniform or non-uniform velocity.

Figure 13:
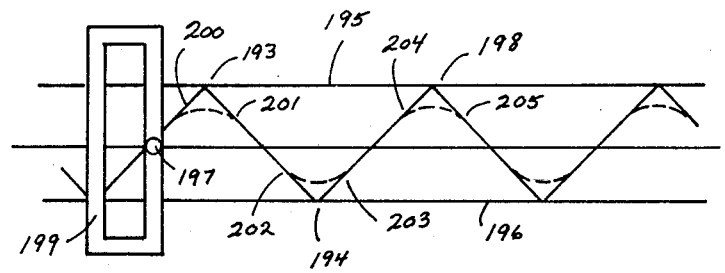
FIG. 13 is a schematic plan view of a typical cut line produced when the web velocity and the transverse velocity of the first framework are both uniform.
Figure 19:
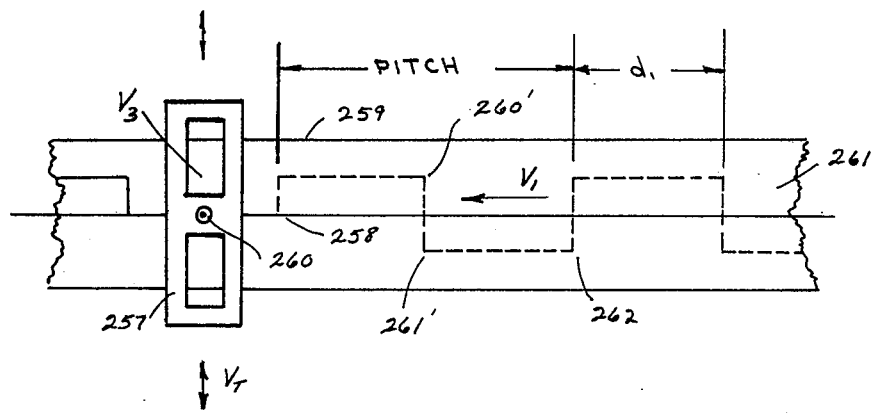
FIG. 19 is a schematic plan view showing a movable transverse cutter and the resultant shape with transverse cut portions.

The resultant web speed changes make it possible to perform certain cutting patterns which will be different from the shape of FIG. 13. For an example of the effect of the web velocity changes relative to the cutting device, reference is made to the transverse cut 260-261 of FIG. 19. In FIG. 19, $V_1$ is infeed web velocity, and $V_3$ is web velocity in the substantially central portion of the web shifter (not shown in FIG. 19).

Figure 14:
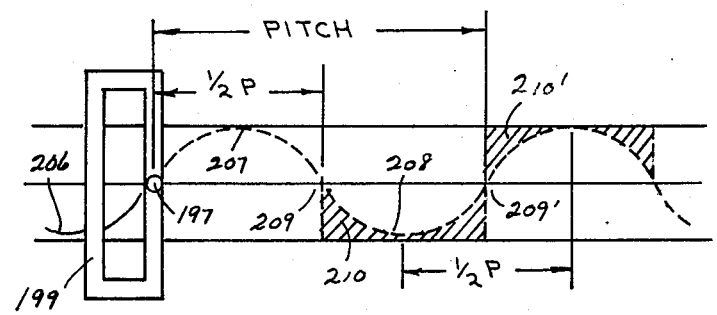
FIG. 14 is similar to FIG. 13 but shows the effect of non-uniform velocity of the transversely moving frame.

When framework 257 moves non-uniformly across the margins of the web, and the web volocity is constant, (no movement of frame 71), a sine wave per FIG. 14 results. For making a transverse cut 260'–261' of FIG. 19, web speed $V_1$ is reduced to zero when it is in the central cutting zone, this reduction caused by moving the framework 71 at the velocity of ½ of $V_1$ in FIG. 3. In this instance, the transverse motion of framework 257 can be at uniform velocity as long as zero relative web velocity is maintained for a sufficient time for the cutter to transverse the web. It will be appreciated that cutter frame 257 of FIG. 19 can be moved at a non-uniform (accelerated) velocity in order to reduce the time for cutter 260 to transverse the web, hence yielding a potentially higher machine speed for equal conditions, or allowing more time to cut a transverse distance greater than 260′-261′ under the same web speed conditions.

The cutter framework motion and the resultant motion caused by movement of the web "shifter" device are independent motions, but when used in combination, they make it possible to cut complex shapes from moving webs, and, by optimum correlation of these two independent variables, higher speeds are achievable. It is noted that each motion can be uniform or non-uniform, is reversible, and can be intermittant with a dwell for at least a portion of a cycle.

Figure 4:
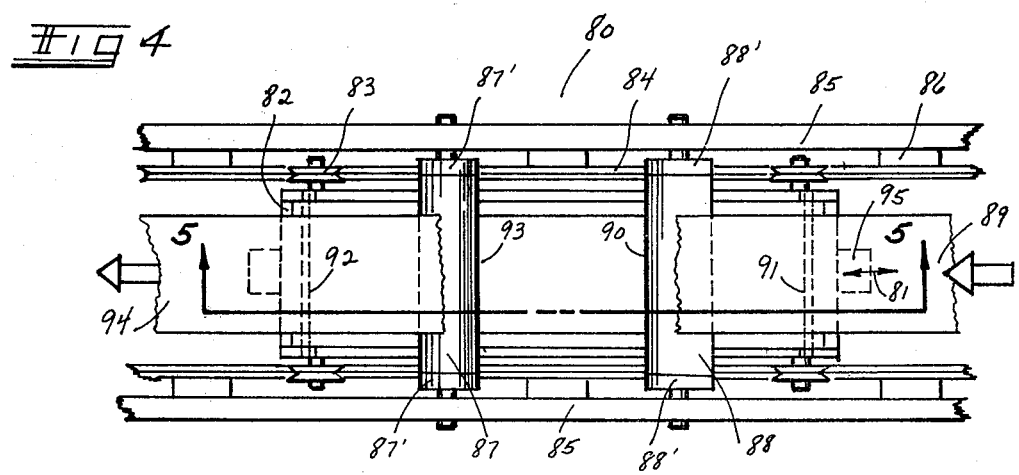
FIG. 4 is a plan view of the movable frame device coacting with fixed rollers, to produce web velocity changes.

In FIG. 4, a web velocity changing mechanism 80 consists of a framework 82 movable in longitudinal direction (arrow 81) and 82 supported on V-groove rollers 83 that rest on rails 84. The rails are attached to framework 85 and spaced therefrom by members 86.

Lightweight rollers 87-88 held on each end by headers 87′ and 88′ are rotatably journaled in side frames 85 and 85′. Infeed web 89 (see right side) travels to roller edge 90, and wrapping roller 88, reverses until it reaches rod 91. Said rod, along with rod 92 being fixedly attached to the movable framework 82. The web passes underneath rod 91, moves to the left in FIG. 4 and FIG. 5, upwardly and around rod 92, then toward the right until it reaches surface 93 of roller 87, then to the left as at 94.

In FIG. 5, extended lugs 95 and 95′ can be operatively engaged by cables, linkages, cams, etc., to mechanical reciprocating devices or reversible motors etc., (not shown). It is within the scope of this invention to apply uniform or non-uniform velocity producing means.

With certain materials, it may be advantageous to drive the rollers. In FIG. 6 (web material not shown for clarity), a timing belt pulley 96 is driven through a timing belt 97 by a power source (not shown). Pulley 98 on the outside of the main frame 99 coacts with an endless timing belt having drive teeth on both sides, said belt operatively connecting drive pulley 98 to fixed pulleys 100, 101, and movable pulleys 102, 103. Pulleys 102, 103 are connected to rollers 104 and 105 respectively, and this plurality of pulleys and rollers are attached to a movable framework 106. The framework can be moved as described hereinbefore. Fixed pulleys 100, 101 are connected to headers of rollers 107 and 108 respectively, said pulleys and rollers being fixed with respect to the main stationary framework 99 and 99′.

As described above, the motion of framework 106 increases or decreases the web velocity (see $V_w$ in FIG. 3 and 7). A separate belt takeup pulley (not shown) can be used to maintain belt tension, in which case fixed rollers 100 and 101 can be mounted as at 109, or a pair of bi-directional takeups can be provided as at 110 and 110′.

FIG. 7 is a simplified side elevation showing how the two pairs of driven rollers are arranged to be driven by pulley 96. The web travel (shown dotted) moves from position 111 around pulleys 101-103-102-100 and then exits at 112.

In FIG. 8 another embodiment of the web shifter is shown wherein single rollers 113 to 122 along with roll sets 123-124-117-118 and 125-126 are fixed, and movable sets 127-129 move downwardly as roller set 130-132 moves upwardly. The web shifter can also be arranged to selectively engage coactive rollers 127 and 130, or rollers 127-128 and 130-131, etc., depending on the ratio of change required in the "effective cutting zone."

For transverse cutting, or for cutting at acute angles with respect to the web direction, an embodiment according to FIG. 9 can be used for applications where the web velocity (ft./sec.) is about equal to the web width (ft.) or where the web speed (ft./sec.) does not exceed about 5 times the web width. However, a number of variables can be changed to alter these approximate ratios.

The embodiment of FIG. 9 includes a carriage 133 that is supported by wheels or gears 134 traveling on rails (or racks) 135-136 and 137-138. In this instance the carriage 133 moves diagonally across the web along line 139-140 which is at a 45 degree angle from a transverse line 141-142. As a variable that affects the maximum permissible speed while still cutting a transverse (90 degree) line across the web, it is within the scope of this invention to adjust angle "α" and the carriage tracks etc., in order to produce a bias cut with respect to the edge; i.e., an angle not perpendicular to the edge of the web.

With greater angles "α", the cutter 143 will still cut a transverse line (as at 141-142) when the cutter speed equals the vector 143-145 and the higher web speed equals 142-145.

To further increase speed capacity of the diagonal cutting device, a secondary carriage 146 is mounted below (or above) the primary carriage 133.

In FIG. 9, carriage 146 is arranged to move parallel with the web axis, and in this illustration, can move in a reverse direction (vis-a-vis the web) until cutter 147 is transposed to point 148, said movement of the carriage taking place on rails, rack gears, or within guides 149-149′ and 150-150′. Starting at point 148, the cutter begins to cut the left margin of the web that moves in the direction of 153. When the cut begins on the left margin a cutter 143 is positioned at 147, and at the instant the cut begins, the advanced cutter (as at 148) moves at linear uniform velocity along line 148-148′ which line is at angle "B" to the transverse line 148-154. In this example, the oblique linear guide 135-316 . . . , etc., and angle "α" are as illustrated, and line 148-148′ at angle "B" would allow a web velocity to width ratio of about 5:1. Increasing angle "α" and the traversing angle of the primary carriage will increase "B" and increase the speed potential of this transverse or bial cutting device.

As the total distance for cutter travel increases (as at 148-148′), it is evident that an additional time interval will be required for the cutter to return to its starting point (as at 148), thus, the distance between transverse or bias cuts increases. In the example where α equals 45 degrees, the speed of the traversing cut is equal to the web speed, and using this criteria, the distance between cuts would be at least 2 times the web width when the carriage return velocity is equal to the carriage cutting velocity. There are many instances where a shorter distance is desired between transverse cuts, and the arrangement of FIG. 12 will give these beneficial results.

Referring again to FIG. 9, it is possible to make a reverse bias cut under pre-selected web speed limits. With the secondary carriage framework 146 retarded as far as possible to describe cutter position 155 (bottom left margin), the carriage 146 can retract at a uniform speed while it transverses the web. Without web movement, the cutter at 155 will proceed to point 156. This represents reverse motion relative to the web, and after subtracting the forward web vector 156-157, it will be noted that the resultant cut line can be a reverse bias cut line 155-157.

FIG. 9 illustrates the relative motions, adjustable angles of the primary carriage, and changes in the resultant cutting line when velocities of the web change. Variable and non-uniform velocities for either (or both) the primary and secondary carriages are within the scope of this disclosure.

With non-flexible materials such as expanded foam polyurethane plastic sheets, insulation, etc., certain downstream devices such as pull rolls can be used.

Another embodiment of the first and second framework sliding assemblies is shown generally at 158 in FIG. 10. The first framework 159 moves parallel with the direction of the web flow in either direction (actuating means not shown). Framework 159 slides along parallel shafts 160-161, said shafts being attached to stationary side frames 164, 165 with supports 162-162' and 163-163'. Bosses 166, 166', 167 and 167' hold shafts 168 and 169 which in turn support the second framework 170 which has journals within bosses 171 and 172 thereby permitting movement in a direction perpendicular to the direction of web travel 173 of FIG. 10.

In FIG. 10, portions of framework 170 are removed for clarity, in order to show the movable plate 174 in the plan view.

FIG. 11 is a side elevational view of the two frame system of the embodiment of FIG. 10 and, while it clearly shows movement of the second frame as dependent and related to movement of the first frame, these motions can be independently powered, as long as there is a mechanical connection between the two movable frames.

The frame 170 of FIG. 11 supports a solenoid, or equivalent device, which, through linkage 176 moves plate 174 to the right when interruption of the jet 177 from cutting device 178 is desired.

Normally, the jet 177 will pass through opening 179 (see FIG. 10) and when interruption of the stream is desired, solenoid actuation of plate 174 to the right will move holder 180 and insert 180' directly under nozzle 178. Insert 180' is downwardly sloped to deflect jet 177 toward the bottom of the V-shaped trough, and thence through discharge pipe 181.

In the framework 57 of FIG. 1 or 170 of FIG. 10, one cutter is shown, but a plurality of cutters can be supported by the framework, at least two of which are in a line parallel with the web direction as shown in FIGS. 15, 16, 18 and 21.

Since the infeed pipe 182 (FIG. 11) moves in either direction, or at some oblique angle thereto, pipe 182 will have a substantial length parallel with the web flow, and a substantial length perpendicular to the web flow to allow flexing of the pipe which can be supported with flexible straps of substantial length.

Impact jet water cutters operate at about 60,000 p.s.i.g., and cannot be instantaneously turned on or off without severe hydraulic shock, hence interruption and diversion can accomplish intermittent cutting while allowing the jet system to operate continuously.

FIG. 12 is a plan view schematic of a device used to produce transverse cuts in a piece of continuously moving material. Sprocket 183 on vertical shaft 184 and sprocket 185 on vertical shaft 186 supports a continuous chain 187. Chain 187 is arranged with lugs and receptacles for the cutting devices. One receptacle is used for each impact-jet cutter, with individual feed lines to each receptacle/cutter being centrally placed above the chain-sprocket "carousel."

Each cutter is placed within a separate receptacle, said receptacle each supported by freely rotatable bearings to prevent torsional forces, thereby preventing rupture of the feed lines. The same general arrangement can be used with impact-beam cutters. In this arrangement, the nozzle portion only (like 178 of FIG. 11) is mounted on the rotating chain, and the upwardly extending feed lines must be of adequate length (height) to allow a "pendulum" like swinging and rotational movement about a substantially central point that is at a substantial distance thereabove.

In FIG. 12, the chain-sprocket assembly is adjustably arranged at some angle "α" to the direction of material movement, and is in mechanically timed relationship such that the velocity vector 188 of motion 190 is equal to web velocity 191 and results in a transverse cut parallel to vector 189.

The scope of this invention includes the use of a third pivoting idler in chain run 192 to accommodate different chain lengths (and/or pitches) so that the mounting distance between two consecutive receptacles for the cutter nozzles can be changed, and, alone, or in combination with a pre-determined angle "α" can result in a different distance between any two consecutive transverse cuts. Slotted gearing or equivalent means in the drive train allows for initial synchronization of cut lines with any pre-determined starting point on the moving piece of material.

Descriptions hereinabove explain structures and apparatus used to define a versatile cutting system.

It will be appreciated that many mechanical and/or electrical variations are possible within the scope of the inventive system.

An additional design feature that affects the apparatus is the number and location of cutting devices attached to the movable frames, said devices in any combination coacting with one or more stationary cutters not mounted on a movable frame.

Typical cutter locations are shown in FIGS. 13 through 26, and certain representative movements of said cutters (frames) are shown to illustrate typical end results that can be achieved.

Because of the versatility of the cutting system, only a small group of representative embodiments are illustrated, but said disclosure and details are not to be interpreted as limiting.

FIGS. 13 to 26 apply primarily to cutter placement for defining the apparatus, but the drawings also illustrate cutter direction and speed relationships relative to the material being cut, and, therefore, are also illustrative of methods and utilization of the system described.

FIGS. 13 to 26 progress from relatively simple arrangements (and resultant shapes) whereby one or more movements are uniform, to other illustrations which involve non-uniform velocities and complex motions.

Other illustrations show the beneficial end results that can be obtained when complex motions are used with intermittant (or interrupted) cutting action.

FIG. 13, for example, shows an irregular cutting line with two linear portions per pitch length (193 to 198), one being generated (as from 193 to 194) during movement of the cutter 197 and framework 199 from the top margin 195 to the bottom margin 196, and the other portion 194 to 198 during reverse framework motion from 196 to margin 195 at uniform velocity.

In FIG. 13 and the following illustrations showing shaped results, the cams, linkages, mechanisms, and/or other well known motion inducing devices are not shown for the sake of clarity.

The uniform transverse velocity motion of FIG. 13 will be speed limiting due to the high acceleration forces caused by abrupt directional changes of framework 199 at points 193-194-198 etc., but if consistent with end use, the curve (and shape of the resultant cut piece) can be modified by decelerating the framework near the limits of travel, such changes in motion resulting in modified portions of the curve shown dotted, as at 200-201-202-203, etc.

FIG. 14 shows the cutting results and shapes derived from the same devices and arrangement of FIG. 13, with the exception that the framework is moved transversely at non-uniform velocity at points 206-207-208 according to the principles of acceleration-deceleration and non-uniform velocities of crankshaft movement. It is also noted that the same cutting line and curvilinear shape of FIG. 14 can be achieved by combining uniform velocity transverse movement of the cutter in coacting relationship with non-uniform web velocity that is maximum at point 207 and minimum at point 209, 209' etc.

In FIG. 14, the desired cut shape (s) is shown crosshatched, as at 210, 210' etc., and it is noted that the balance of the material left over would be wasted or unused.

Figure 15:
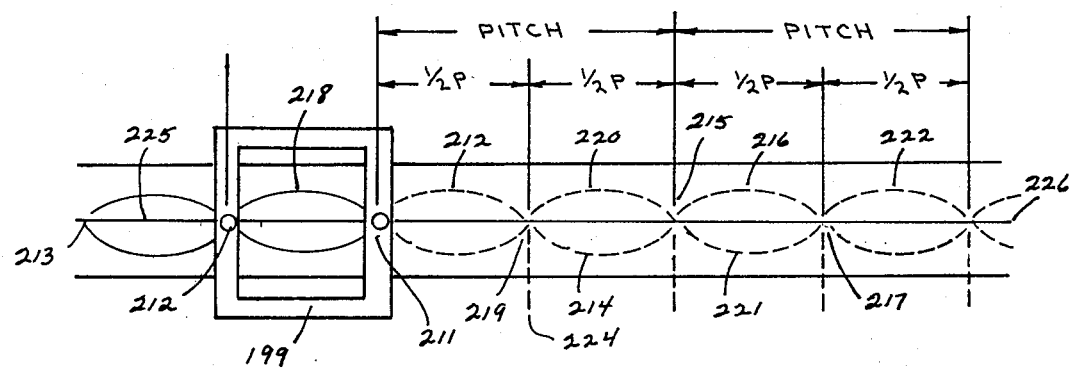
FIG. 15 is a schematic plan view of an arrangement similar to FIG. 14, but with two cutters mounted on the common transversely moving frame.

An arrangement of cutters according to FIG. 15 can be used to reduce waste. Uniform web velocity can be used with non-uniform transverse velocity of the cutter. However, the spaced relationship between cutter 211 and 212 is noted. Spacing must be one-half "pitch length," and cutter 211 will generate cut line 211-212-213-214-215 . . . 217, etc., also noting common cutting points 211-213-215, 217 . . . etc.

By intersecting cut lines (points 223-224) at the common inflection points, a series of consecutive, identical shapes are produced on both sides of a common central axis 225-226.

Figure 16:
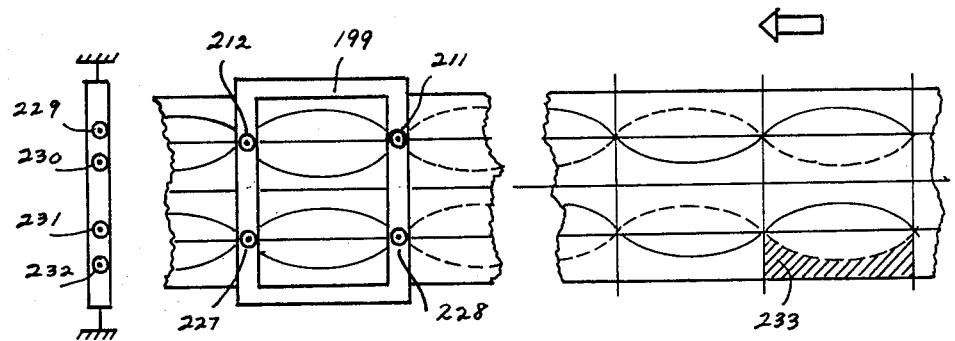
FIG. 16 is similar to FIG. 15, but with a second pair of cutters mounted on the same frame.

FIG. 16 shows a method for producing a multiplicity of identical shaped cutouts similar to shape 210 of FIG. 14 by using a second set of cutting devices 227 and 228. Fixed non-movable cutters, as at 229 to 232 can be used for cutting lines parallel with the direction of web travel and thereby produce a modified shape, as at 233 of FIG. 16.

Figure 17:
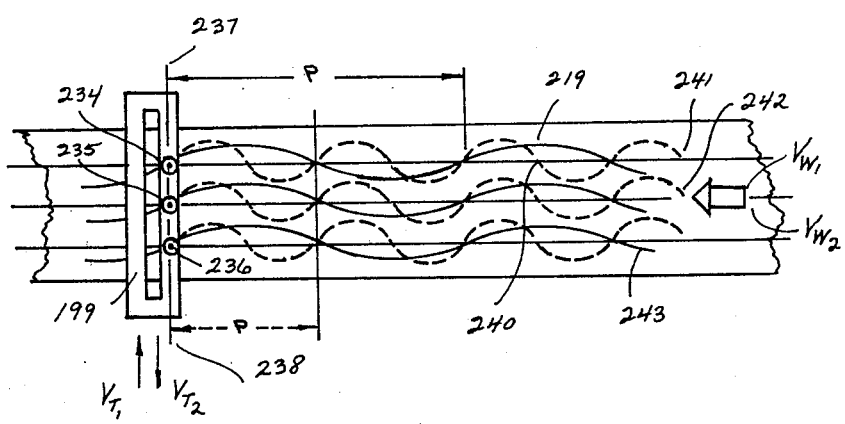
FIG. 17 is a schematic plan view of three transversely aligned cutters mounted on a common transversely movable frame.

FIG. 17 shows a plurality of impact beam or impact jet cutting devices 234, 235, 236, mounted on a common frame 199 and co-incident with line 237-238.

Any motion imparted to the framework is likewise imparted to all cutters, thereby resulting in a plurality of curvilinear lines (shown solid), all of which are similarly shaped and spaced apart from each other a distance equal to the pre-determined transverse spacing between any two adjacent cutters.

The sinusoidal type curvilinear lines result from a combination of uniform web velocity $V_w$ and non-uniform reversing motion $V_{t1}$ and $V_{t2}$ of framework 199 having cutters 234-235, and 236 mounted thereon.

With the same arrangement and spacing etc., the effect of decreasing web velocity is shown by the dotted curvilinear sinusoidal lines 234-241, 235-242, and 236-243. The increased velocity $V_{w2}$ is twice the velocity of $V_{w1}$, and the pitch of the solid lines is twice the pitch of the dotted lines, although the amplitude of the curve (and transverse displacement of the frame) remain the same in both curves.

This invention also discloses a system for cutting shapes having portions that are substantially linear.

Figure 18:
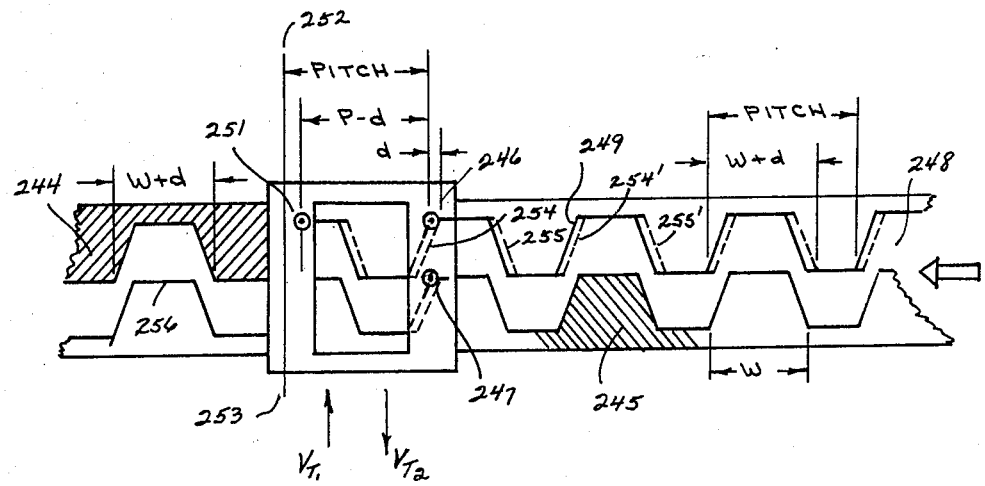
FIG. 18 is a schematic plan view showing a plurality of two cutters aligned transversely and a third cutter displaced a distance less than the "pitch" of the shape produced.

FIG. 18 illustrates interlocking shapes 244 and 245 that are generated by cutters 246-247. Parts 244 and 245 would interlock after the cut shapes are produced and the intermediate portion is discarded. In this instance, both shapes would have a "root" width of W, and the pieces are separated only by the thickness of the cut line. In the event that a greater clearance between substantially vertical side portions 249, 250 is preferred, a third cutting device 251 can be located a distance "d" in advance of a line 252-253 which trails (lags) the leading (or first to cut) devices 246, 247 by a distance equal to the pitch length of the shape, hence, cutter 251 trails the lead cutters a distance equal to "pitch" minus "d". The offset distance "d" from a transverse pitch repeat 252-253 will cause the trailing cutter 251 to generate cut lines 254, 255, 254', 255'. . . etc. Cut portions between (for example) 249 and 254' are discarded along with intermediate portion 248, said cut portions creating a width between a series of shapes equal to W+d. The cut shapes 244 and 245 can therefore be "interlocked" with ample clearance between elements.

FIG. 18 is representative of the effects produced when offsetting a following (trailing) cutter from the nominal trailing pitch distance.

In FIG. 18, web velocity (relative to the cutter), during the cutting of portions like 256, is generally uniform, but during the cutting of portions like 246, is considerably reduced. However, said velocity becomes non-uniform by advancing or retarding the (second) framework as this action results in two parallel vectors that are unidirectional and additive, or bidirectional and subtractive, as hereinafter described (reference FIG. 23).

FIG. 19 illustrates typical results that can be achieved when only one longitudinal motion and the transverse motion are modified. In this instance, transverse motion $V_t$ of framework 257 could involve uniform velocity from point 258 to 259, at which displacement (and time) framework 257 and cutter 260 would dwell until web 261 has moved toward the left, and cutter 260 has produced an axial cut line 259-260'. At this instant, web velocity $V_1$ becomes zero, and the framework and cutter 260 moves from point 260' to point 261'. Transverse velocity of the framework from 260' to 261'. . . etc. . . , can be uniform or non-uniform, and web velocity $V_1$ from points 261' to 262. . . etc. . . can be uniform or non-uniform.

In view of further disclosures hereinafter, it is also to be understood that when non-uniform axial movement of the web is involved, the transverse motion of the cutter can be uniform, and a "perpendicular" cut can be achieved when the advance-retard feature of the second movable framework is used to modify the speed of the cutter with respect to the web.

Figure 20:
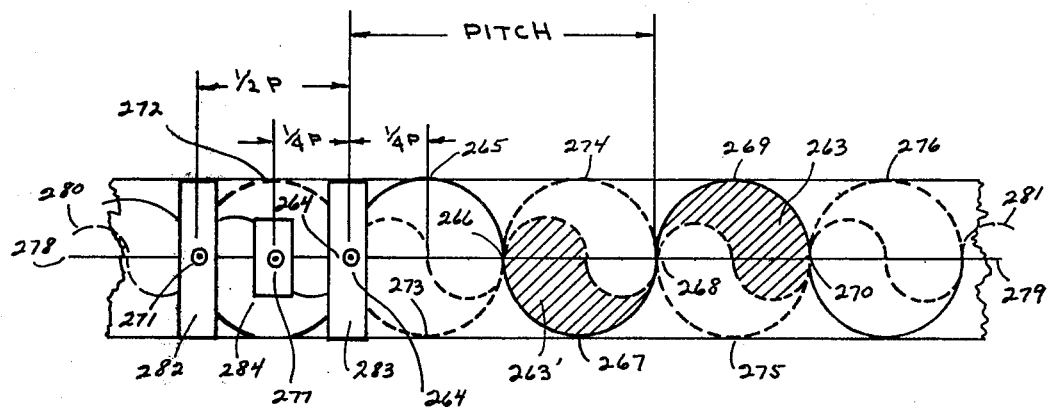
FIG. 20 is a schematic plan view showing three separated transversely movable frames and the resultant shapes produced.

FIG. 20 shows an irregular shape 263 (crosshatched) and a similarly shaped cutout 263', both of said shapes being cut from the inside of circular shapes.

Cutter 264 generates curve 264. . . 270. Cutter 271 is displaced a distance equal to one-half the pitch of the shape and trails cutter 264 (relative to web movement). Cutter 271 generates curve 271-272-264-273-266-274-268-275-270-276. . . etc. A third cutter 277 generates a lower amplitude curvilinear line that is symmetrical about line 278-279, said curve represented by phantom curve starting at 280 and terminating at 281.

With uniform web velocity, cutter 271 and associated framework will move transversely in unison with cutter 264 and its associated framework 283, cutter 277 and framework 284 will move one-half the distance of cutters 271, 264, and at the same transverse speed, will define the curved shape that crosses the central axis 278-279 at intervals of one-fourth "pitch."

Intermediate cutter 277 must therefore be independent of the motion of cutters 271 and 264.

Figure 21:
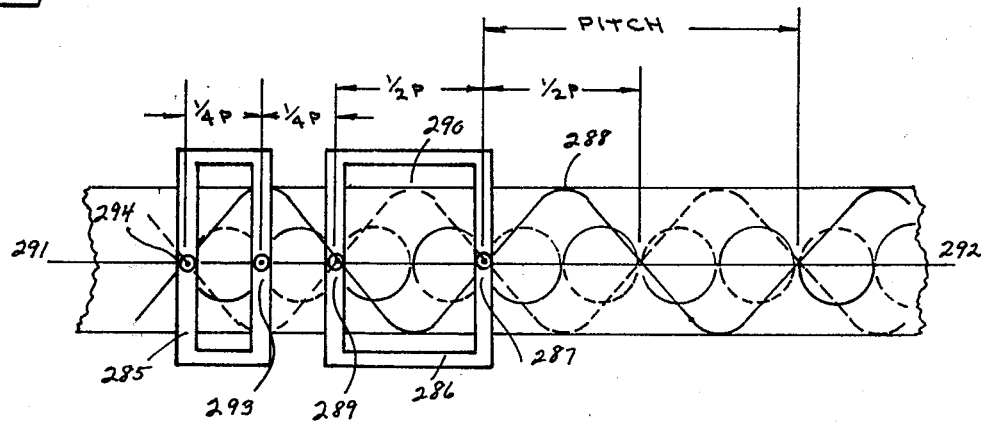
FIG. 21 is a schematic plan view showing two independently movable frames, each with a plurality of cutters and the resultant shape produced.

FIG. 21 similarly involves two independently transversely movable framework members 285, 286, each having a plurality of cutters.

As framework 286 moves upward in FIG. 21, cutter 287 generates curve 287-288... etc., (shown solid), and cutter 289 generates a similar curve 289-290... etc., on opposite sides of central axis 291-292.

Framework 285 moves at the same velocity as framework 286, but, since it travels only half the (vertical) distance, it will define the smaller circular curves of FIG. 21. Cutter 293 cuts the solid portion, and cutter 294 cuts the dotted portion. Each framework is moved independently because of the difference in total displacement from the central axis.

Figure 22:
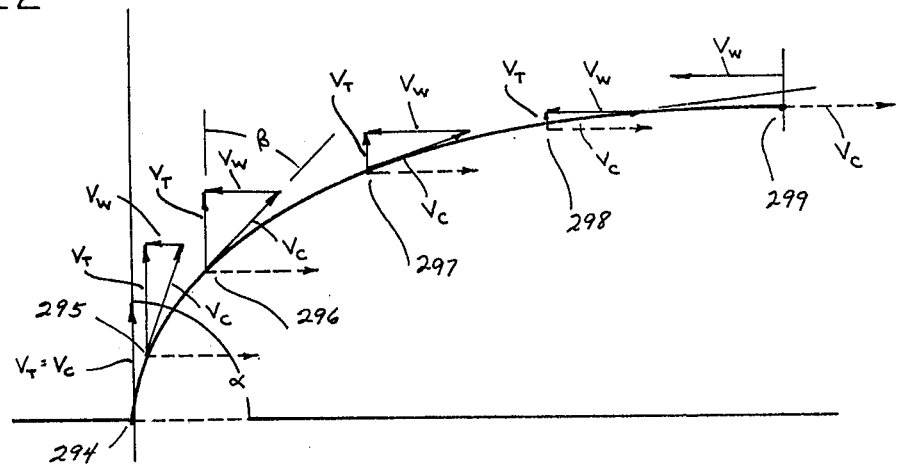
FIG. 22 is a schematic plan view of a typical curved line showing vector components parallel and perpendicular to the direction of web travel.

FIG. 22 shows how instantaneous values of web velocity $V_a$ and transverse velocity $V_t$ can be determined, said values transformed to velocity motions of the framework across the web ($V_t$) and movement of the web relative to the cutter ($V_w$).

Polar coordinates can be used to define the curve, for example, at point 294, a vector equal to zero and an angle of $\alpha =$ ninety degrees define point 294.

Point 295 is defined by a straight line vector 294-295 and angle $\alpha$. To determine the velocity $V_t$ and the velocity of the web $V_w$ required at any instant in order to generate the curve, angle $\beta$ must be determined—and will be ninety degrees minus $\alpha$ at any instant. Since the angle $\alpha$ is defined for any point on the curve, the instantaneous transverse velocity will be $V_t - \cos \beta$, and the web velocity will be $V_w = \sin \beta$. At point 294, web velocity is zero and transverse velocity equals cutter velocity ($V_{t=Vc}$), that is, the cutter velocity vector transverse the web equals the cutter velocity while the web is stopped.

As the cutter 294 proceeds along points 294-295-296-297 ... etc., the transverse velocity decreases and web velocity increases, until at point 299, the web velocity equals the cutter velocity (relative to the web) and the transverse movement is stopped or zero.

The purpose of FIG. 22 and this description is to emphasize the adaptability of the cutter system herein described to computer programming.

Figure 23:
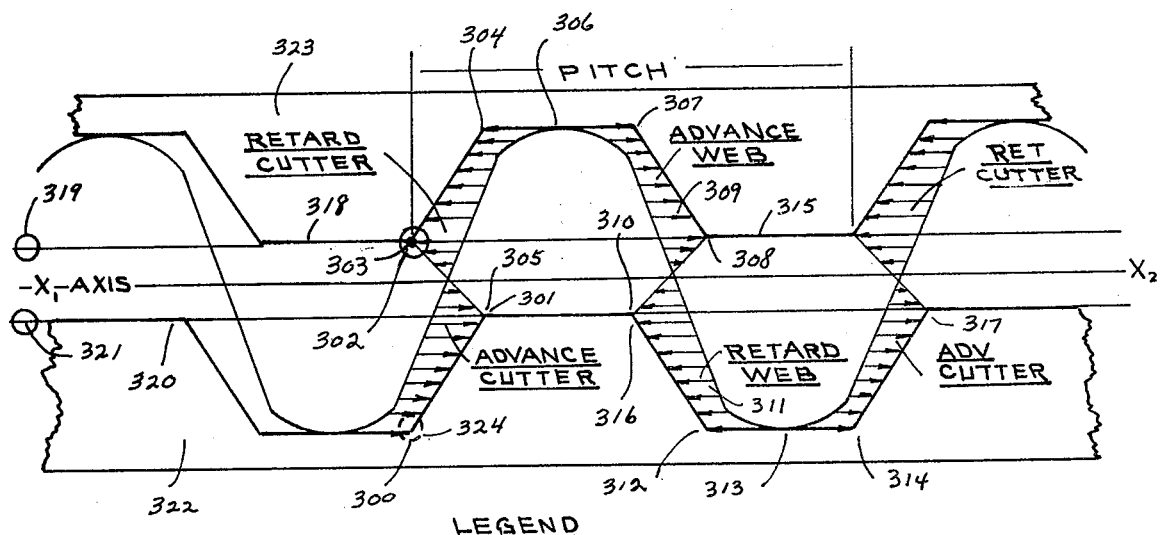
FIG. 23 is a schematic plan view showing vector relationships between three motions and how the cut-line is modified to produce irregular lines from a reference sinusoidal curve.

FIG. 23 is used to illustrate the principles employed to produce an irregular shape having linear portions by using a substantially sinusoidal reference curve as a base movement that is modified.

The sinusoidal "reference" movement of the cutter is established as a combination of certain transverse movements coacting with certain web velocity movements, said base curve representing cutter movement *relative to the web*.

By using a movement, that is, the advance-retard movement of a second framework, and by changing the magnitude of web velocity at certain pre-determined times, the "reference" movement can be modified to produce irregular linear cuts from a curvilinear reference line.

Cutter 302 is shown at the reference starting point of the repeat or "pitch" of the irregular shape. Note that during the preceding cut portion 300-301 the cutter was advanced (moved opposite the direction of material movement), and at point 301 has completed the cut 300-301. In order to cut the line 303-304, the cutter must move from 301 to 303, and it is noted that a reversal of position (with respect to transverse centerline $X_1$-$X_2$ of FIG. 23) from an advanced to a retarded position is involved. For this reason, a certain distance is required between point 305 to point 303, said distance allowing time for the cutter to reverse positions relative to its neutral or mid-position as the cutter proceeds moving upward from 301 to 303.

By retarding the cutter a distance equal to the horizontal vector of 305-303, the cutter is in proper location to cut 303-304 while the position is constantly being readjusted to equal values of the vectors between 303-304. The cutter 302 reaches point 304, it should instantaneously move to point 307; however, the physical repositioning must overcome inertia of the cutter at 304, and since some time lag is involved, such instantaneous reversal is not possible. Recognizing that web speed must be slow enough to permit accurate control, positioning of cutter 302 from point 304 to point 307 is accomplished by a controlled web advance, as described below.

From point 307 to point 308, cutter 302 will cut line 307-308 and be adjustably positioned variable amounts equal to the vectors shown during the web advance mode 309.

From point 308 to point 310, the web must reverse from the web advance mode 309 to the web retard mode 311, and the web speed advance-retard system performs this function during the time required for the cutter to move downwardly a distance equal to space 315-316.

As noted, both the cutter change at 301 and the web speed change 308 involve a gradual reversal from advance to retard as represented by vectors on either side of the reference curve.

During the interval of time available before repeating the same exact sequence at an upstream position one pitch length away, cutter 302 reverses from position 305-303 to the opposite side of the transverse centerline, and assumes a position relative to the transverse centerline of the framework as represented by vector 313-314, this being in the proper advance position to commence cutting of line 314-317 when the web controlled cut 310-312 reaches 313.

Flats 318 and 315 are subsequently cut by fixed cutters 319, while flat cuts 320-316 are cut by fixed cutter 321.

From point 317, the sequence repeats as above described.

Normally the shaped pieces 322, 323 (like gear teeth) would be produced by using two cutters spaced apart a distance equal to 302-324, said cutters being mounted on a common frame. However, it becomes evident that by combining the cutter advance-retard and the web loop velocity changing system, in combination with the number, location, pitch distance between cutters, and the numerous curves or "profiles" available with continuous, modified, cyclic, or indexing motions, the various shapes that can be cut become almost limitless.

One other aspect of the invention relates to the ability to use cutters that can be operated intermittantly, or, when using water jet cutters, the additional use of selectively operated "interrupting" means between the cutter nozzle and the piece being cut. With these "intercutters producing the equivalent of line or curvilinear segments rather than continuous lines, it is possible to produce interior "cutouts" of holes having non-cut material wholly surrounding said cutouts, as described in detail hereinbelow (refer to FIG. 26).

Figure 24:
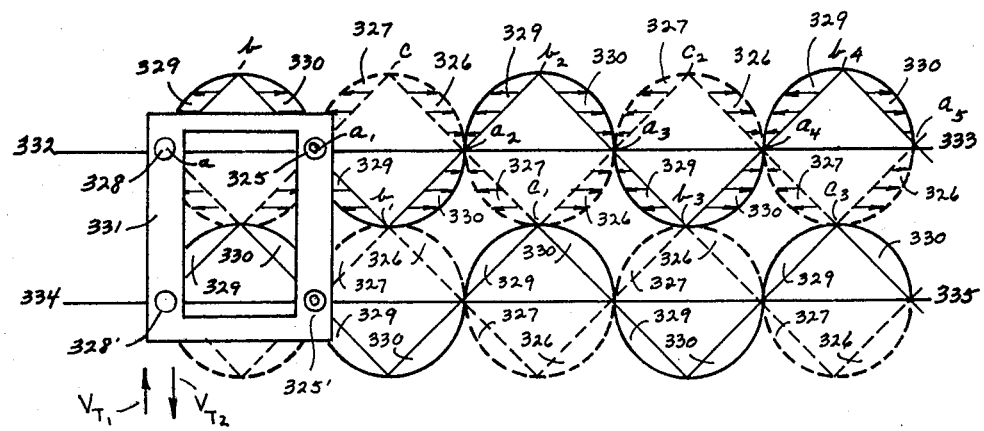
FIG. 24 is a schematic plan view of an arrangement used to produce circular shaped objects.

FIG. 24 illustrates the use of the web loop system to change the web velocity relative to the cutter in combination with the advance-retard framework and the fixedly mounted cutter—both motions affecting changes that occur in the direction of the cutter relative to the web.

Framework 331 has cutters 325 and 328 mounted thereon. When the framework and cutters move transversely at uniform velocity, and the web moves at uniform velocity, cutter 325 will generate cut line $a_1$-c-$a_2$-$c_1$-$a_3$-$c_2$-$a_4$-$c_3$ etc., and cutter 328 will generate cut line (shape) a-b-$a_1$-$b_1$-$a_2$-$b_2$- . . . etc.

In order to generate a series of circular shapes along axis 332-333, the web velocity can be advanced (330), and alternately retarded (329), and the framework capable of axial displacement can be advanced (326), or, alternately retarded (327).

It will be noted in FIG. 24 that the vector values from straight line a-b to the circular cut lines approach zero as the cut line approaches point b, and when the web changes from retard (329) to advance (330), it does so under optimum conditions whereby acceleration forces are almost zero due to substantially uniform velocity in the change from 329 to 330. The same condition occurs with cutter advance 326 and retard 327. It is noted that these optimum conditions occur consecutively throughout the series of cuts and curves.

Figure 25:
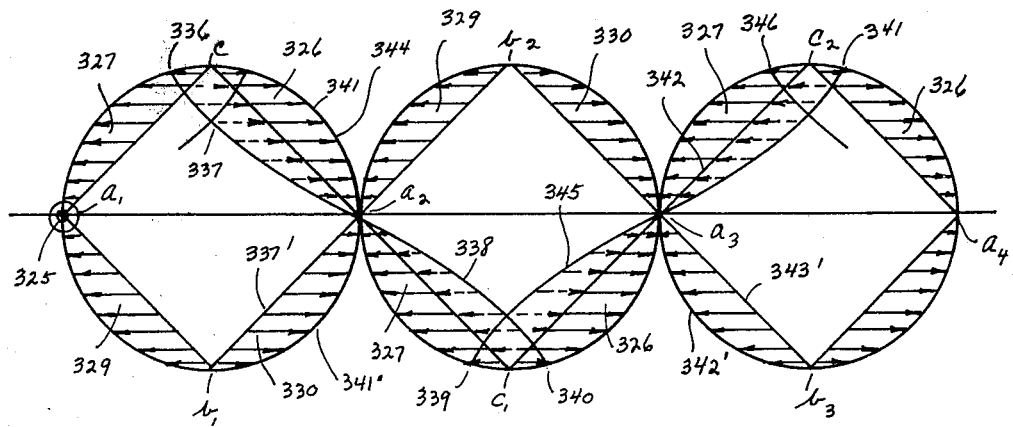
FIG. 25 is an enlargement of a portion of FIG. 24.

FIG. 24 shows the apparent velocity of the cutter as the length of vectors 327 between straight line $a_1$-c to the curved line, however, FIG. 25 illustrates and describes the velocities as they are affected and modified by simultaneous changes in web velocities.

In FIG. 25, cutter 325 generates semi-circular curved lines $a_1$-c-$a_2$-$c_1$-$a_3$-$c_2$ . . . etc., and cutter 328 (see FIG. 24) generates semi-circular curves $a_1$-$b_1$-$a_2$-$b_2$-$a_3$-$b_3$ . . . etc.

With uniform transverse velocity of the movable framework 331 of FIG. 24, and with uniform velocity of the web, irregular lines $a_1$-c-$a_2$-$c_1$ . . . etc., would be cut, but the advance-retard feature of the second framework coacting with the web velocity changing system results in the semi-circular shaped cuts.

In the left hand circle, the advance cutter mode 326 shows solid vectors between the straight line c-$a_2$, as required to follow the circular shape. The solid vectors (correction factors) are hereinafter referred to as the "apparent correction;" however, the bottom portion of the circle from $b_1$-341-$a_2$ is actually line $b_1$-$a_2$ as modified by vector corrections shown in the advance web mode 330.

Since these correction factors are applied simultaneously, that is, since the web velocity changes at the same time that the cutter retard correction factor is applied, the correction (and displacement) applied to the cutter is incomplete until the effect of web velocity change (and displacement) is taken into account.

For example, in the left upper semi-circular portion, vector 341-344 is the apparent correction, but since the web is also changed an amount equal to vector 337'-341', the apparent vector is added to vector 337-341, and the "actual" and true correction factor will be vector 337-344.

In FIG. 25, the irregular straight line is modified by vectors similar to 337'-341' when the web advance or web retard mode is effective, and vectors equal to two times vector 337'-341' are used to correct the total movement and velocity of the axial cutter movement when the "retard cutter" or "advance cutter" mode is effective. In the latter instance, the total correction factors (vector) applied are equal to the difference between the circular shape and the curvilinear line c-33-6-A-337-$a_2$-338-340-$c_1$-339-345-$a_3$-343-341-$c_2$-34-6-347 . . . etc.

It will be appreciated that the shape of the cut line defined above can be altered if a third variable, namely nonuniform velocity of the transversing framework is introduced, said third variable being useful to decrease high acceleration rates in certain regions of the corrections "zones," for example, at region 339-$c_1$-340 (center bottom of FIG. 25).

In essence, FIG. 25 defines certain conditions and variables whereby a series of circular shapes can be produced; however, this description is not intended to be limiting as to scope of additional variables that can be advantageously used to produce the same shape.

For certain products, internal cutouts are desirable. FIG. 26 shows a web 348 with cutouts 349, 350, and 351. Cutter 352 and movable framework 353 dependently coact with framework 354 which moves perpendicular to web axis 355-356 at velocity $V_{t2}$. Cutter 352 will generate cut lines 357-358,357$_a$-358$_a$, . . . etc., that is, the upper portions of the cutout above the axis 355-356.

Likewise cutter 359 is mounted on framework 360, and both will move coactively with transversely movable framework 361, generating the cut line 361-363 below axis 355-356. Note that framework and cutter 359 are located a distance equal to "pitch" length said distance being downstream from cutter 352 and, therefore, said cutting extends oppositely from the cutting action of 352.

To generate each of the cutout shapes 349-350-351, the same description and motions apply.

In FIG. 27, certain motions and time sequences are required for each cutout (349 etc.) of FIG. 26 are described in more detail, with certain cross references being made in the description.

In FIG. 27, uniform speed of the web is shown by vector $V_w$.

At the instant cutter 352 begins to cut the top portion of the cutout 357-358, and because the web is moving, framework 353 must be moving to the left at the same velocity as $V_w$. The velocity vector of the framework 353 (and attached cutter 352) is shown by vector 364, and it will be appreciated that if the cutter is advanced at the same speed as the web, transverse axis 365-366 also moves at web speed and provides a reference line from which additional movement of the cutter can be measured. To follow the contour of line 357-367, the movement of the cutter with respect to the web is equal to the solid right hand vectors between line 365-366 and curve 357-367.

Resultant movement of frame 353 with respect to its central transverse axis (neutral position) will be represented by curve 368-365, thus, for example, at point 357, the framework moves at web speed and, relative to axis 365-366, cuts point 357 coincident with said axis. When cutter 352 reaches point 367 due to transverse movement of framework 354, the cutter is stationary with respect to framework 354 and will cut line 367-370 because the web is moving relative to the cutter.

During the time required for the web to move from position 367-370, the axially movable framework 353 must move from a displacement equal to 365-367 in one direction, to a displacement relative to vertical axis 372-373 equal to 371-370. At this instant, the framework 353 must have a velocity equal to, and in the same direction, as web velocity, said velocity being equal to 371-369, and as the cutter moves transverse the web, said velocity vector will decrease as shown by vector curve 370-358, until at central longitudinal axis 355-356, the cutter and framework move to the left at a velocity equal to 358-375, (said vector being equal to web speed).

At the instant of reaching point 358, the interrupting mechanism shown in FIG. 11 can be actuated to intercept the impact-jet stream, and thus make it possible to move in any direction across any portion of the web without cutting it. This desirable end result permits any movement of the cutter in order to place it in a position and location of readiness to cut the next in a series of cutout. For example, from a cutter retard motion equal to 356-375, the cutter has to move to a central position 357 during the time required for the web to move from position 358 to 357$_a$ (see FIG. 26) between cutouts.

In FIG. 27, the motions required by the first and second frameworks are described while assuming uniform velocity. It is understood that non-uniform velocities of one or both frameworks as well as non-uniform velocity of the web can be used to produce similar results.

It is also noted that by using an impact-beam cutter with intermittent operation or the impact-jet cutter with intermittent operation (or the interrupting device of FIG. 11), that spaced apart cutouts (or interrupted cutting lines) along exterior margins of other webs or materials is also possible. The intermittent or discontinuous cutting operations can be used to space apart the cut shapes with any multiple of pitch length therebetween.

In summary, it becomes evident that a cutting system with such variables can include mechanical components to activate and control certain functions. However, this invention will allow greater versatility, faster response rates and higher speeds when the interaction and limitations of all variables are compared with memory programs computerized controls. It is noted that once a program is written and stored, setup time on future production runs of the same item is drastically reduced to almost instantaneous computer response; thus, the inventive cutting system is especially well suited where a significant number of sizes, styles, and quantities are required.

It is understood that the present invention may be embodied in other specific forms without departing from the spirit or special attributes hereof, and it is, therefore, desired that the present embodiments be considered in all respects as illustrative and, therefore, not restrictive, reference being made to the appended claims rather than to the foregoing description to indicate the scope of the invention.

Having thus described my invention, what I claim as new and desire to protect by Letters Patent are the following:

1. In a method of cutting shapes from a continuously moving web the steps of:
   (A) providing a plurality of spaced apart web support means whereby said space defines a cutting zone;
   (B) moving a web continuously across said cutting zone;
   (C) mounting a plurality of impact type cutters on an overhead frame coincident with a line parallel to the web direction;
   (D) moving said frame and plurality of cutters transversely of said web in a direction perpendicular to said web direction;
   (E) whereby each of said cutters cuts a co-linear portion of the web from only alternate product shapes in a co-linear series of consecutive product shapes.

2. The method of claim 1 wherein said framework and cutters are moved transversely of said moving web reversing motion at non-uniform velocity, said movement resulting in a plurality of curves, said consecutive curves being defined by consecutive plus and minus values of P in formula $X^2 = 2P\,Y$, and being on alternating sides of a centerline that is parallel with the direction of web movement.

3. The method of claim 1, whereby one of said cutters does not cut any portion of the product shape intermediate of the two alternating product shapes.

4. The method of claim 1 whereby each of said cutters cuts a like portion from each of alternate products on one side of a line parallel to the web direction, and after advancing the web a distance substantially equal to an integer of product length, cuts a similar portion from each of two alternate products on the other side of a line parallel to web flow, said alternating products on one side being shifted one product length from products on the other side of said parallel line.

5. The method of claim 4 wherein the transverse velocity of said framework and cutters is non-uniform on one side of said parallel line and different from the velocity of said framework on the other side of said parallel line.

6. The method of claim 1 whereby said cut lines on each side of the product intersect at the beginning and end of the product.

7. The method of claim 1 wherein at least two cutters are spaced apart in the direction of web travel a distance equal to one product length.

8. The method of claim 1 wherein the space between at least two cutters in the direction of web travel is not equal to one product length.

9. The method of claim 1 wherein at least one additional cutter is mounted on a second line parallel to said parallel line.

10. The method of claim 9 wherein at least one of said additional cutters is mounted on a perpendicular line transverse with one of said first impact type cutters.

11. The method of claim 1 wherein said plurality of cutters is fixed to a second frame, said second frame being supported by, and reversibly movable with respect to, said first frame, said movement being parallel to the direction of the web and perpendicular to the movement of said first frame.

12. The method of claim 1 wherein said web support means includes a plurality of rollers mounted in a reversibly movable frame whereby the velocity of flexible web entrained around said plurality of rollers changes with movement of said frame in a direction parallel to the direction of the web.

13. The method of claim 1 whereby actuation of cutter interrupting means causes discontinuity of the cutting line from at least one of said plurality of cutters.

14. The method of claim 1 whereby a first plurality of cutters is arranged in line with the web direction and at least one of the second plurality of in-line cutters is arranged in juxtaposed relationship, said second plurality of cutters coacting to cut a second plurality of sequential product shares from the same continuously-moving web.

15. The method of claim 13 wherein said web is flexible and said first or second pluralities of cutters are displaced vertically.

16. The method of claim 13 whereby a similar grouping of said first and second plurality of cutters is added above the first group of cutters and the topmost web of a plurality of flexible webs is routed to said cutter grouping arranged above said first cutter grouping.

17. The method of claim 1 wherein the top-most web is a plurality of superposed webs.

18. The method of claim 1 wherein said continuously moving web is a plurality of webs.

19. The method of claim 1 wherein a flexible web is folded upon itself about a fold line parallel to the direction of web travel and wherein all cutters in a plurality of cutters simultaneously cut similar shapes on one side of said fold line, each of said simultaneously-cut shapes being displaced from other of said cut shapes in a direction parallel to the direction of said web travel, whereupon unfolding of said cut web defines a cut shape that is symmetrical about a fold line.

* * * * *